United States Patent [19]
McLarney

[11] Patent Number: 4,731,697
[45] Date of Patent: Mar. 15, 1988

[54] ARC RESISTANT TRIMABLE CERAMIC CAPACITOR

[75] Inventor: Joseph C. McLarney, Portville, N.Y.

[73] Assignee: AVX Corporation, Great Neck, N.Y.

[21] Appl. No.: 46,098

[22] Filed: May 5, 1987

[51] Int. Cl.[4] .................. H01G 4/10; H01G 7/00
[52] U.S. Cl. .................... 361/321; 29/25.42
[58] Field of Search ............ 361/321, 433 C, 277; 29/25.42

[56] References Cited
U.S. PATENT DOCUMENTS

| | | | |
|---|---|---|---|
| 2,552,653 | 5/1951 | Stupakoff | 361/321 |
| 3,277,354 | 10/1966 | Ikeda et al. | 361/321 X |
| 4,267,565 | 5/1981 | Puppolo et al. | 361/433 |
| 4,439,814 | 3/1984 | Rhodes | 361/321 |

FOREIGN PATENT DOCUMENTS

| | | | |
|---|---|---|---|
| 2374730 | 8/1978 | France | 361/321 |
| 28213 | 7/1980 | Japan | 361/321 |

Primary Examiner—Donald A. Griffin
Attorney, Agent, or Firm—Arthur B. Colvin

[57] ABSTRACT

An arc-resistant trimable monolithic ceramic capacitor is disclosed. The capacitor includes a surface electrode covered by a further dielectric layer, the further dielectric layer including an aperture registering with portions of the surface electrode, margins of the surface electrode being covered by the further dielectric layer. The capacitor may be trimmed, if necessary, by eroding portions of the surface electrode exposed through the aperture of the further dielectric layer. The covering dielectric layer prevents arc-over at the edges of the surface electrode and prevents changes in value of the finished capacitor by preventing portions of the surface layer from separating from the further dielectric layer.

5 Claims, 4 Drawing Figures

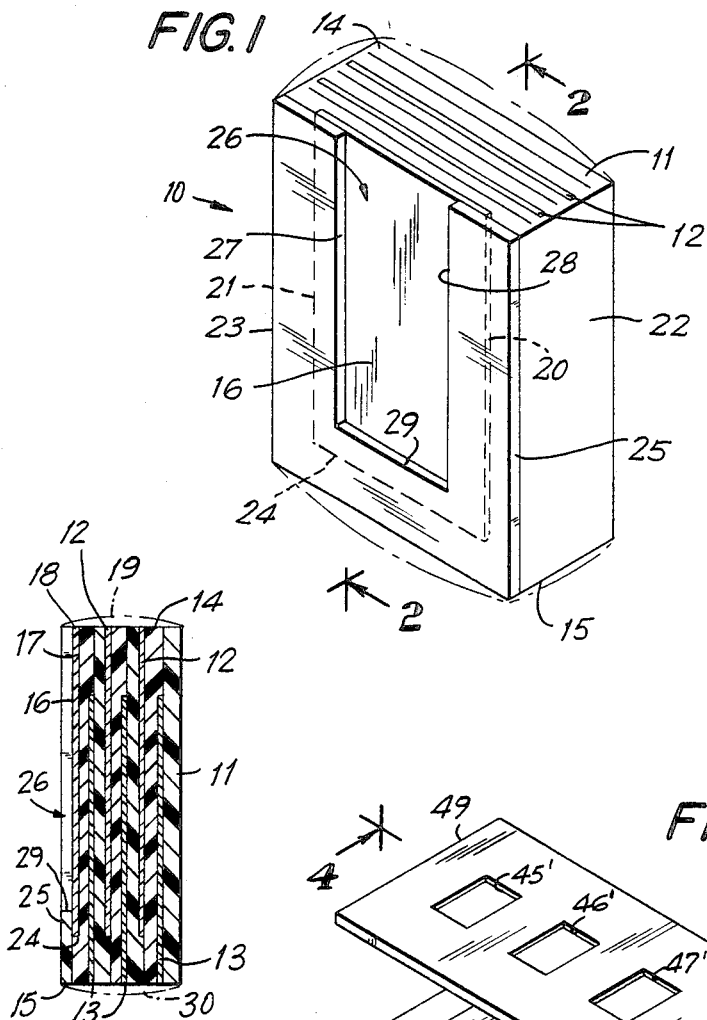
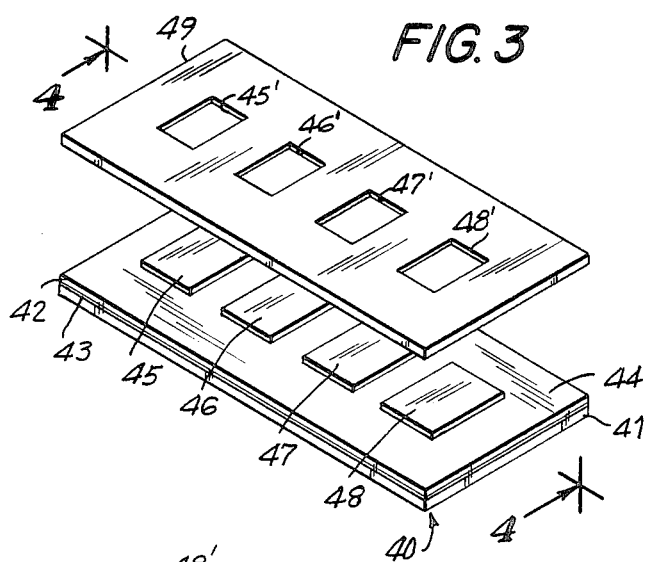
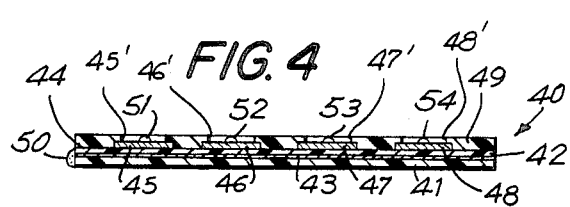

ARC RESISTANT TRIMABLE CERAMIC CAPACITOR

BACKGROUND OF THE INVENTION

1. Field of the Invention

The present invention is in the field of ceramic capacitors and relates more particularly to a trimable ceramic capacitor, i.e. to a capacitor which may be adjusted to precise tolerances as required in certain applications. The invention is further directed to an arc resistant capacitor which may also be trimmed if desired.

2. Prior Art

As conducive to an understanding of the present invention, it is to be noted that in many applications it is necessary to provide monolithic ceramic capacitors which are tuned or adjusted to precise tolerance limitations. In the normal manufacturing procedures for ceramic capacitors, it is virtually impossible to achieve on a repeatable basis ceramic capacitors of the necessary tolerance accuracy. This is true, because the capacitance will depend to a great degree on such factors as the thickness of the green ceramic layers, the processing parameters employed, and the composition of and particle size of the ceramic granules in any given batch which is processed.

In view of the aforementioned difficulties of obtaining ceramic capacitors of precise values, it is conventional to manufacture the capacitor to approximate tolerance ranges and to adjust the capacitance by reducing the same after the capacitor has been formed. Representative examples of patents teaching such post-formation tolerance adjustments are as follows:

3,394,386; Weller et al
3,456,170; Hatch
3,688,361; Bonini
3,694,710; Kirschner
3,898,541; Weller
4,074,340; Leigh
4,190,854; Redfern
4,466,045; Coleman
4,467,393; Kupfer
4,470,096; Guertin In general, the adjustment procedures involved in respect of such capacitors involve eroding or abrading away increments of the dielectric and upper layer or layers of electrode to progressively reduce the overlapping area of dielectric and electrode until the capacitance is reduced to the desired value. The eroding may be effected while the capacitance is continuously measured.

It has been proposed, in order to facilitate tolerance adjustments of ceramic capacitors to apply a surface or exposed electrode atop the outermost layer of ceramic and to effect final tolerance adjustments by eroding portions of the exposed electrode layer only, rather than requiring eroding of the more durable ceramic components. Attempts to employ surface electrode erosion for capacitance adjustment have heretofore proven commercially unfeasible. For reasons which were heretofore unexplained, capacitors which were modified to a specific capacitance value were found over a period of time to shift in value rendering the same unsuitable for use. Additionally, capacitors having surface electrode layers were highly subject to arc over problems, i.e. electrical discharges between margins of the surface electrode and end termination of the capacitor.

SUMMARY OF THE INVENTION

The present invention may be summarized as directed to an improved non-arcing trimable ceramic capacitor. The present invention is predicated upon the discovery that the tolerance change and arc over problems encountered in respect of surface electrode trimable capacitors heretofore known may be eliminated by superposing over the surface electrode a frame or window wherein the margins of the surface electrode are covered by a ceramic dielectric material while leaving a central area of the surface electrode exposed for removal to permit adjustment of the capacitor value and/or to effect contact with the electrode. More particularly, I have discovered that the tendency of a surface electrode and particularly a once adjusted surface electrode to vary following adjustment is due to the tendency of the surface electrode material to separate microscopic distances from the surface of the ceramic layer to which it is secured. Such separations are so minute as not to be apparent to the eye. However, the minute shifting movements of the electrode material from the capacitor surface results in a modification of the value of the capacitor thereby negating the advantage of providing a trimable adjustable layer.

It is accordingly an object of the invention to provide a readily trimable capacitor which enables facile adjustment either by the manufacturer or by the purchaser of the capacitor. A further object of the invention is the provision of a capacitor having a surface electrode to permit easy capacitance adjustment, the capacitor being free of the tendency of capacitance variation due to electrode separation. Still a further object of the invention is the provision of a capacitor of the type described which is free of arc over problems and which enables surface elctrode contact. In order to obtain these objects and such other and further objects as may appear herein or be hereinafter pointed out, reference is made to the accompanying drawings in which:

BRIEF DESCRIPTION OF THE DRAWINGS

FIG. 1 is a perspective view, partially diagramatic in nature, of a capacitor in accordance with the invention.

FIG. 2 is a section taken on the line 2—2 of FIG. 1.

FIG. 3 is an exploded perspective view of a further embodiment of the invention.

FIG. 4 is a section taken on the line 4—4 of FIG. 3.

DETAILED DESCRIPTION OF THE DRAWINGS

Referring now to the drawings and particularly to FIG. 1 thereof, there is disclosed a capacitor 10 comprised as is conventional of a series of alternate layers of ceramic dielectric material 11 between which layers are interleaved electrodes 12, 13 of opposite polarity. As is conventional, the electrodes of same polarity are exposed at the same ends of the capacitor. Thus, the electrodes 12 have edge portions exposed at end 14 of the monolith, the opposite margin of the electrodes 12 terminating short of the other end 15 of the capacitor. End margins of the electrodes 13 are exposed at the edge 15 the margins of electrodes 13 remote from edge 15 terminating short of the opposite end 14 of the capacitor.

As thus far described, the capacitor is entirely conventional. In accordance with the present invention, in order to permit tuning or trimming of the capacitor to a precise value, a rectangular surface electrode 16 is deposited on an outermost dielectric surface 17 of the capacitor. The surface electrode 16 includes an uppermost edge 18 which extends to the end 14 of the capacitor. It is thus seen that the end 18 of the surface electrode 16 is co-terminus with the ends of electrodes 12 and thus, when termination 19 (shown in phantom) is applied to the end 14 of the capacitor, the electrode 16 will be electrically connected to the series of electrodes 12.

As best seen in FIG. 1, the side margins 20, 21 of the electrode 16 terminate in spaced relation to the adjacent side margins 22, 23 of the capacitor. Similarly, end margin 24 of the surface electrode 16 terminates in spaced relation to the end 15 of the capacitor.

A cover layer 25 of ceramic dielectric material is applied over the surface electrode 16. It will be appreciated that the cover layer 25 is applied in the course of formation of the capacitor and thus, forms a portion of the monolith. The cover layer 25 includes a cutout portion or window 26 defining a partial frame for the surface electrode 16. More particularly, the cutout portion or window 26 is defined by side edges 27, 28 which overlap side edges 21, 20 respectively of the electrode. End margin 29 of the window overlaps end margin 24 of the electrode material 16.

The ends of electrodes 13 exposed at edge 15 of the monolith are interconnected by termination 30 which is likewise shown in phantom for purposes of clarity of illustration.

As will be apparent from the preceding description, there is defined between terminations 19 and 30 a capacitance the value of which is a function of the area of overlap of electrodes 12 and 13, and, in addition, the area of overlap of exposed electrode 16 and the nearest adjacent electrode of the group 13. In order to reduce the capacitance of the capacitor 10, it is merely necessary to erode increments of the exposed electrode 16 which are readily accessible through window 26. The eroding procedure is preferably carried out through the use of a laser directed against the metal layer 16 through window 26. It will be understood that the laser volatilizes the metal progressively reducing the additive capacitance provided by the layer 16 as a function of the amount of metal removed by the laser. Alternate means of eroding the layer 16 may be employed, i.e. mechanical or chemical. Preferably, the capacitance of the capacitor 10 is continuously monitored during the removal step, the removal procedure being interrupted when a desired capacitance is achieved.

In contrast to trimable capacitors employing surface electrode layers heretofore known, wherein the trimmed value achieved progressively changes over time due to electrode separation from dielectric surface as heretofore described, I have discovered that the application of the surface dielectric component which overlaps the margins of the surface electrode functions to somehow prevent separation of the electrode material from the dielectric surface not only in the overlapped areas but in the central areas exposed through window 26. In addition, since the margins 20, 21, and 24 of the surface electrode 16 are covered by the surface dielectric layer, the capacitor is free of any tendency toward arc over.

In FIGS. 3 and 4, there is disclosed a further embodiment of the invention. In accordance with the embodiment of FIGS. 3 and 4 a monolithic capacitor 40 is comprised of a pair of dielectric layers 41, 42 having an electrode layer 43 disposed therebetween. The upper surface 44 of dielectric layer 42 includes a plurality of surface electrodes 45, 46, 47, 48 formed thereon. A cover layer 49 of dielectric material is superposed over dielectric layer 42, the layer 49 including four windows 45', 46', 47', 48' positioned to register with the electrodes areas 45 through 48 respectively. The windows are smaller than the electrode areas 45 through 48 and hence, the margins of the electrode areas are covered by the dielectric layer 49 while at the same time exposing surface portions of the electrodes through the windows.

As will be perceived from the above descriptions, each of the electrodes 45 through 48 defines an individual capacitance with electrode layer 43. The capacitors defined include a common termination 50, the separate terminations 51, 52, 53, 54 being made to the electrode areas 45 through 48 respectively. Each of the individual capacitances thus formed may, if required, be individually trimmed as discussed hereinabove by eroding away portions of the electrode exposed through the windows 45' through 48'. In any event, since the borders of electrodes 45, 45, 47, 48 are covered by overlying ceramic material, the capacitance will remain constant and the device is free from arc-over problems encountered with conventional surface electrodes.

Advantageously, capacitors in accordance with the invention may be made using the same techniques as are conventionally employed in forming monolithic ceramic capacitors. The sole distinction in manufacturing techniques involved with the instant invention resides in the fact that the outermost layer of dielectric material is comprised of a green ceramic film having apertures punched in the film corresponding to the positions of the windows of the embodiments hereinabove described.

As will be apparent to those skilled in the art and familiarized with the instant disclosure, numerous variations in details of construction may be made without departing from the spirit of the invention.

For instance, it is feasible to manufacture a capacitor substantially as shown in the first described embodiment wherein the surface electrode is isolated from the end portions of the capacitor, contact between the surface electrode and one or the other of the series of buried electrodes being effected by an external jumper. It is likewise contemplated in accordance with the present invention, to cover the exposed surface electrode after the final trimming operation by any of a number of conventional molding or dipping techniques. Accordingly, the above description is not to be taken in a limitative sense, but rather the invention is to be broadly construed within the scope of the appended claims.

What is claimed as new and sought to be protected by Letters Patent of the United States is:

1. A constant value trimable monolithic arc-resistant ceramic capacitor comprising alternate layers of electrode and ceramic dielectric material, alternate said electrode layers being exposed at opposite ends of said monolith, said monolith including an outer dielectric layer, a surface electrode formed on said outer layer, said surface electrode covering less than all of said outer layer and having one margin co-terminus with one said end of said monolith, the margin of said surface electrode opposite said one margin being spaced from the other end of said monolith, first termination means at said other end connecting the electrodes exposed at said other end, and second termination means connecting the electrodes at said one end and said one margin of said surface electrode, and a further dielectric layer covering said surface electrode, said further layer including an aperture in registry with portions of said surface electrode, said aperture extending to said one end of said monolith, said further dielectric layer overlying margins of said surface electrode.

2. A capacitor in accordance with claim 1 wherein said further layer covers all portions of the margins of said surface electrode except those of the margins of said surface electrode at said one end.

3. A constant value trimable monolithic arc-resistant ceramic capacitor comprising alternate layers of electrode and ceramic dielectric material, alternate said electrode layers being exposed at opposite ends of said monolith, said monolith including an outer dielectric layer, a surface electrode formed on said outer layer, said surface electrode covering less than all of said outer layer and having one margin co-terminus with one end of said monolith, the margin of said surface electrode opposite said one margin being spaced from the other end of said monolith, first termination means at said other end connecting the electrodes exposed at said other end, and second termination means connecting the electrodes at said one end and said one margin of said surface electrode, and a further dielectric layer covering said surface electrode, said further layer including an aperture in registry with portions of said surface electrode, said further dielectric layer overlying margins of said surface electrode.

4. The method of forming an arc-resistant value adjustable ceramic capacitor comprising the steps of providing a ceramic capacitor preform comprised of alternate layers of green ceramic and electrode material, applying to an outermost surface of one said green ceramic layer, a further electrode layer, said further electrode layer covering less than all of the surface of said outermost layer whereby portions of said outermost layer in surrounding relation to said further electrode are exposed, thereafter superposing a further green ceramic layer over said outermost layer and said further electrode layer, said further ceramic layer including portions superposed over margins of said further electrode layer and said potions of said outer most layer surrounding said further electrode layer, said further ceramic layer having an aperture in registry with said further electrode layer, thereafter processing said preform to define a finished capacitor, and thereafter removing increments of said further electrode layer exposed through said aperture in said further ceramic layer to thereby vary the effective value of said capacitor.

5. The method of forming an arc-resistant value adjustable ceramic capacitor comprising the steps of providing a ceramic capacitor preform comprised of alternate layers of green ceramic and electrode materials, alternate said electrode layers extending to opposite ends of said capacitor, applying to an outermost surface of one said green ceramic layer a further electrode layer, said further electrode layer covering less than all of the surface of said outer most layer, a margin of said further electrode layer extending to one said end of said capacitor, portions of said outer layer in surrounding relation of said further electrode being exposed, thereafter superposing a further green ceramic layer over said outermost layer and said further electrode layer, said further ceramic layer including portions superposed over margins of said further electrode layer and portions of said outer most layer surrounding said electrode layer, said further ceramic layer having an aperture in registry with said further electrode layer and with said one end of said capacitor, and thereafter terminating said capacitor by connecting the margins of said layers of electrode material to said margin of said further electrode at said one end and connecting the margins of said alternate layers at said other end, and thereafter removing increments of said further electrode layer exposed through said aperture in said further ceramic layer to thereby vary the effective value of said capacitor.

* * * * *